(12) United States Patent
Lee et al.

(10) Patent No.: US 12,017,794 B2
(45) Date of Patent: Jun. 25, 2024

(54) SYSTEMS AND METHODS FOR RESTRAINING CARGO ON AIRCRAFT LOADING SYSTEMS USING INDEXING MECHANISMS

(71) Applicant: Goodrich Corporation, Charlotte, NC (US)

(72) Inventors: Brandon David Lee, Wahpeton, ND (US); Wallace Harold Larson, Jamestown, ND (US); Alexander Mitchell Heyd, Jamestown, ND (US); Lynne M Almvig, Mt. Vernon, WA (US); Zachary Meyer, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 713 days.

(21) Appl. No.: 17/226,962

(22) Filed: Apr. 9, 2021

(65) Prior Publication Data

US 2022/0324573 A1 Oct. 13, 2022

(51) Int. Cl.
*B60P 7/06* (2006.01)
*B64C 1/20* (2006.01)
*B64D 9/00* (2006.01)

(52) U.S. Cl.
CPC .............. *B64D 9/003* (2013.01); *B60P 7/065* (2013.01); *B64C 1/20* (2013.01)

(58) Field of Classification Search
CPC . B64D 9/003; B60P 7/13; B60P 7/065; B64C 1/20

(Continued)

(56) References Cited

U.S. PATENT DOCUMENTS 1,360,412 A * 11/1920 Kirchner .................... B60P 7/13
410/67
1,649,598 A * 11/1927 Kirchner .................... B60P 7/13
D12/41

(Continued)

FOREIGN PATENT DOCUMENTS

CN 108791427 A * 11/2018 ............... B62B 3/04
CN 112498212 A * 3/2021 ............... B60P 3/00

(Continued)

OTHER PUBLICATIONS

Oxford English Dictionary online; definition of "gear"; https://www.oed.com/dictionary/gear_n?tab=meaning_and_use#3295849 (Year: 1829).*

(Continued)

*Primary Examiner* — Hilary L Gutman
(74) *Attorney, Agent, or Firm* — SNELL & WILMER L.L.P.

(57) ABSTRACT

A cargo restraint system includes a driving shaft, a first restraint, and a second restraint. The first restraint is operatively coupled to the driving shaft via a first indexing mechanism arrangement. The second restraint is operatively coupled to the driving shaft via a second indexing mechanism arrangement. The first and second indexing mechanism arrangements are arranged such that rotation of the driving shaft in a first rotational direction causes the first restraint to rotate between a lowered position and a raised position, and further rotation of the driving shaft in the same rotational direction causes the second restraint to rotate between the lowered position and the raised position. The first restraint may be axially offset from the second restraint to allow sequential loading and unloading of cargo.

20 Claims, 14 Drawing Sheets

(58) Field of Classification Search
 USPC .............................................................. 410/2
 See application file for complete search history.

(56) References Cited

U.S. PATENT DOCUMENTS

| | | | | |
|---|---|---|---|---|
| 5,131,606 | A * | 7/1992 | Nordstrom | B64D 9/003 |
| | | | | 244/137.1 |
| 7,926,762 | B2 | 4/2011 | Oetken et al. | |
| 8,936,419 | B1 | 1/2015 | Islam | |
| 9,079,665 | B2 | 7/2015 | Larson et al. | |
| 2013/0334367 | A1* | 12/2013 | Larson | B60P 7/08 |
| | | | | 244/118.1 |
| 2018/0273177 | A1* | 9/2018 | Jayaprakash | B60P 7/13 |
| 2019/0248269 | A1* | 8/2019 | Shivalinga | B60P 7/0807 |
| 2021/0387727 | A1* | 12/2021 | Afful | B64D 9/003 |

FOREIGN PATENT DOCUMENTS

| | | | | | |
|---|---|---|---|---|---|
| CN | 113002401 | A * | 6/2021 | ............... | B60P 3/00 |
| CN | 113195889 | A * | 7/2021 | ............... | B60P 3/40 |
| FR | 2789952 | A1 * | 8/2000 | ............... | B60P 7/13 |
| KR | 20150027218 | A * | 3/2015 | | |

OTHER PUBLICATIONS

Wikipedia: Gear; https://en.wikipedia.org/wiki/Gear (Year: 2024).*

* cited by examiner

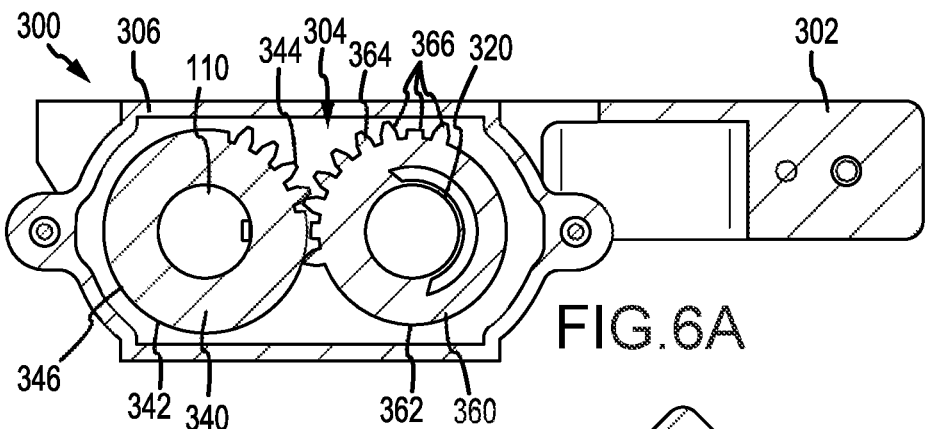
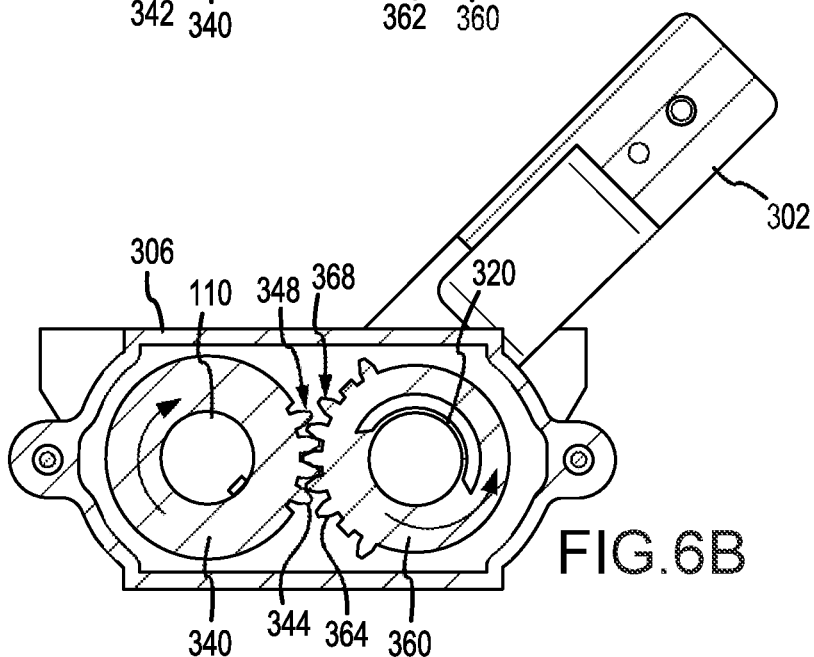
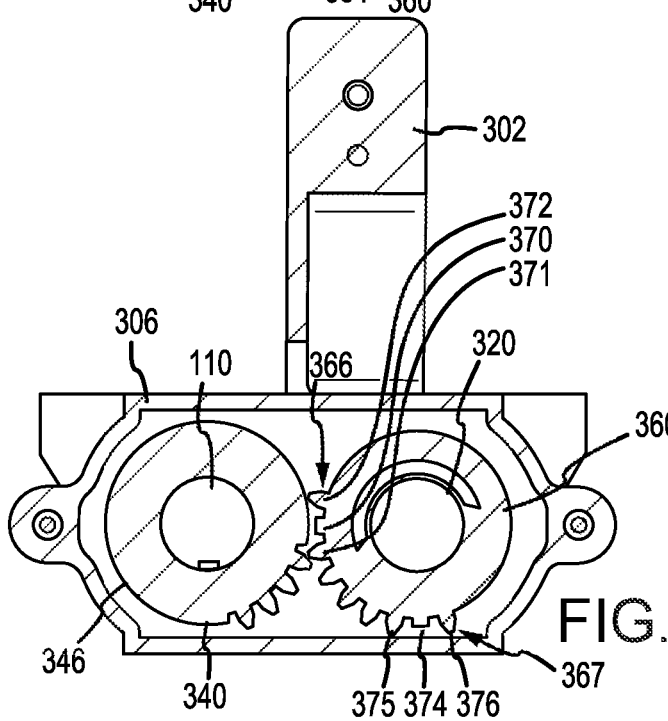

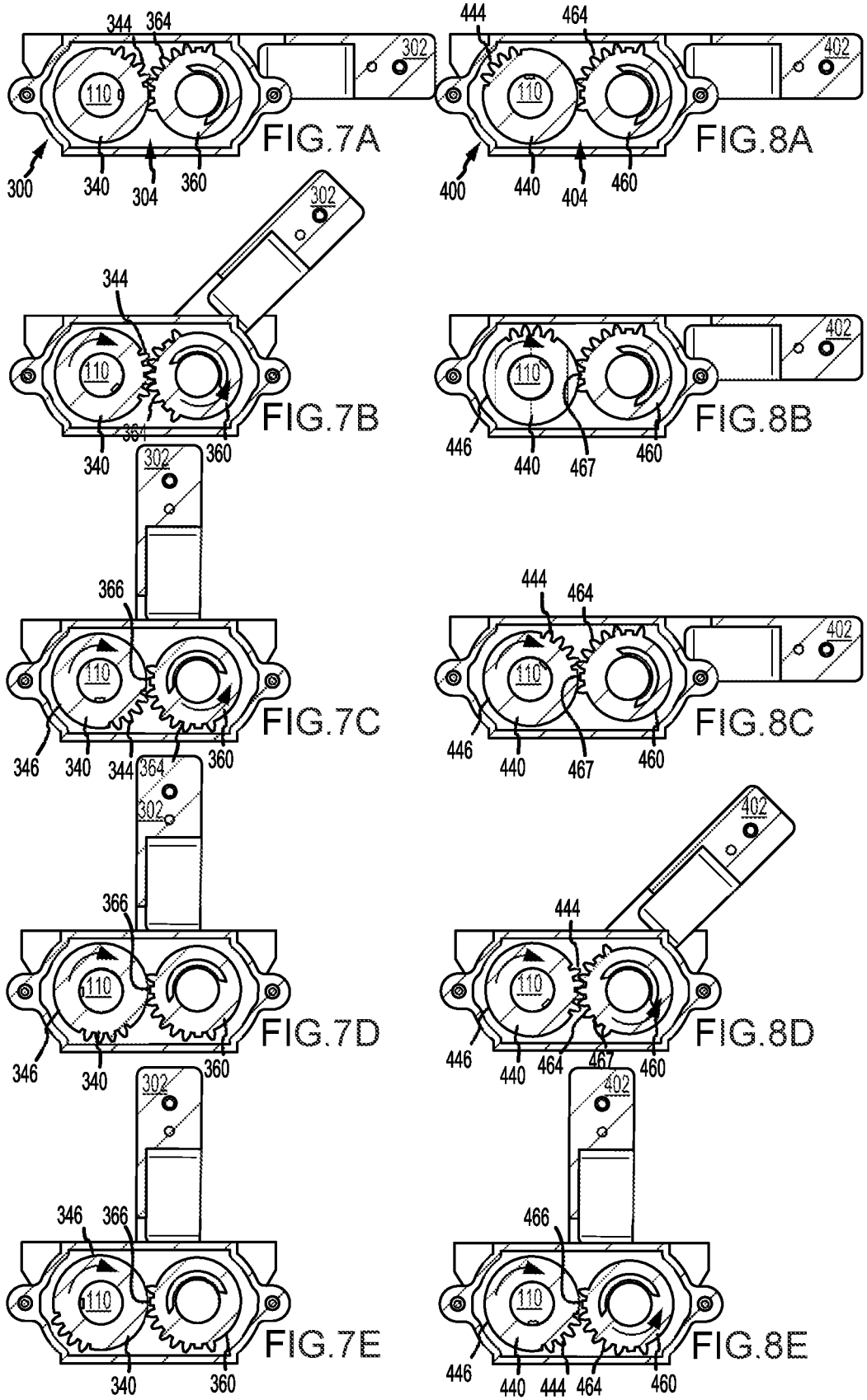

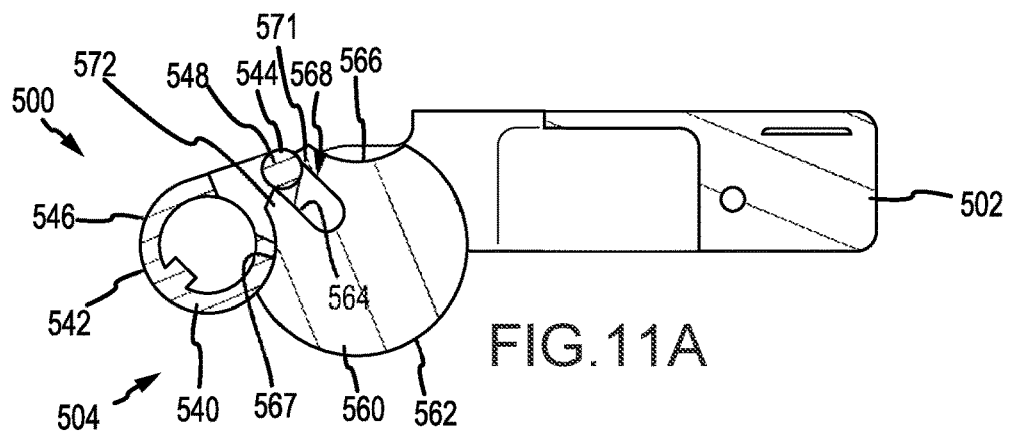
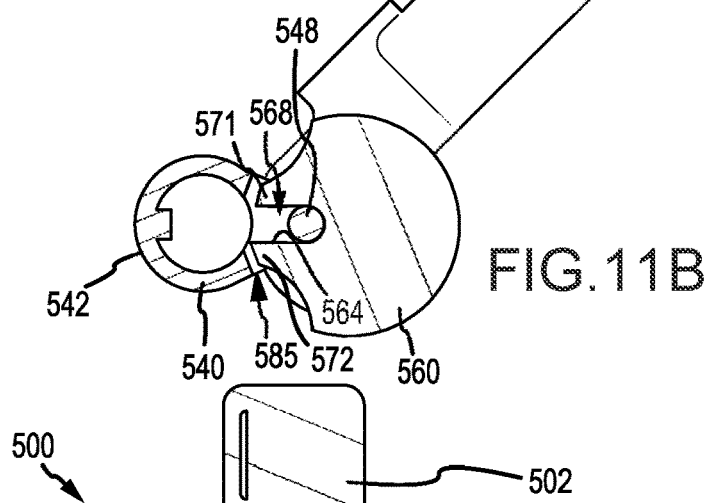
FIG.11A
FIG.11B
FIG.11C

SYSTEMS AND METHODS FOR RESTRAINING CARGO ON AIRCRAFT LOADING SYSTEMS USING INDEXING MECHANISMS

FIELD

The present disclosure is directed to cargo loading systems for aircraft and, more particularly, to a cargo restraint system for restraining cargo in a cargo bay of an aircraft.

BACKGROUND

Many aircraft have at least one cargo bay designed to receive cargo. Such cargo bays include cargo loading systems that include rollers located on a floor of the cargo bay to provide conveyance for moving a unit load device (ULD, cargo) through the cargo bay. After cargo has been loaded into the cargo bay, it may be desirable to restrain the cargo. Such restraint reduces the likelihood of cargo shifting relative to the cargo bay during taxi, takeoff, flight, and landing. Also, it may also be desirable to selectively restrain and release ULDs. Some ULDs, like pallets, have pockets along the sides of the pallet that are used to provide an interface for longitudinal, lateral, and/or vertical restraint. The restraint that interfaces with these pockets moves in and out of the pocket during loading and unloading of the pallet. The restraint that interfaces with these pockets may also provide vertical restraint. The restraint may provide vertical restraint exclusively or in combination with longitudinal or lateral restraint.

SUMMARY

Described herein is a cargo restraint system for use with a cargo loading system of an aircraft. The cargo restraint system comprises a driving shaft, a first driving gear, a first driven gear, a first restraint associated with the first driven gear, a second driving gear, a second driven gear, and a second restraint associated with the second driven gear. The driving shaft is configured to rotate about a first axis. The first driving gear is configured to rotate with the driving shaft, wherein the first driving gear comprises a first driving surface and a first dwell surface. The first driven gear is configured to rotate about a second axis, wherein the first driven gear comprises a first driven surface and a first locking surface. The first restraint is configured to rotate together with the first driven gear between a raised position (also referred to herein as a first raised position) and a lowered position (also referred to herein as a first lowered position). The second driving gear is configured to rotate with the driving shaft, wherein the second driving gear comprises a second driving surface and a second dwell surface. The second driven gear is configured to rotate about a third axis, wherein the second driven gear comprises a second driven surface and a second locking surface. The second restraint is configured to rotate together with the second driven gear between the raised position (also referred to herein as a second raised position) and the lowered position (also referred to herein as a second lowered position). In response to the driving shaft rotating a first preselected number of degrees of rotation, the first driving surface engages the first driven surface to cause the first driven gear to rotate between a first position and a second position, thereby causing the first restraint to rotate with the first driven gear from one of the lowered position and the raised position to the other of the lowered position and the raised position, and the second dwell surface slidingly engages the second locking surface to secure the second restraint in one of the lowered position and the raised position. In response to the driving shaft rotating a second preselected number of degrees of rotation, the second driving surface engages the second driven surface to cause the second driven gear to rotate between the second position and a third position, thereby causing the second restraint to rotate with the second driven gear from one of the lowered position and the raised position to the other of the lowered position and the raised position, and the first dwell surface slidingly engages the first locking surface to secure the first restraint in one of the lowered position and the raised position.

In various embodiments, the first driving gear is axially offset from the second driving gear, and the first restraint is axially offset from the second restraint, and the first restraint is rotatable from the lowered position to the raised position to restrain a cargo in the aircraft.

In various embodiments, the first driving gear further comprises a driver pin and the first driven gear further comprises a driven arm, wherein the driver pin is configured to contact the driven arm to begin rotation of the first driven gear, while the first driving gear is rotating.

In various embodiments, the first driving surface is disposed along a first arc length of a perimeter of the first driving gear and the first dwell surface is disposed along a remainder of the perimeter of the first driving gear.

In various embodiments, the first driving surface comprises a first plurality of teeth and the first driven surface comprises a second plurality of teeth.

In various embodiments, the first dwell surface comprises a convex radiused surface.

In various embodiments, the first locking surface comprises at least one tooth of the second plurality of teeth.

In various embodiments, the first locking surface comprises a shortened tooth of the second plurality of teeth.

In various embodiments, the first driving surface comprises a pin disposed radially from the first axis and the first driven surface comprises a slot configured to receive the pin.

In various embodiments, the first dwell surface comprises a convex radiused surface concentric with the first axis.

In various embodiments, the pin is disposed radially from the convex radiused surface.

In various embodiments, the first locking surface comprises a concave radiused surface configured to interface with the convex radiused surface of the first dwell surface.

A cargo restraint system is disclosed herein, comprising a driving shaft configured to rotate about a first axis, a first driving gear configured to rotate with the driving shaft, a first driven gear configured to rotate about a second axis, wherein the first driven gear is configured to mesh with the first driving gear, a first restraint configured to rotate together with the first driven gear between a raised position and a lowered position, a second driving gear configured to rotate with the driving shaft, a second driven gear configured to rotate about a third axis, wherein the second driven gear is configured to mesh with the second driving gear, and a second restraint configured to rotate together with the second driven gear between the raised position and the lowered position. Rotation of the driving shaft in a first rotational direction between a first rotational position and a second rotational position causes the first restraint to rotate between the raised position and the lowered position, and further rotation of the driving shaft in the first rotational direction between the second rotational position and a third rotational position causes the second restraint to rotate between the raised position and the lowered position.

In various embodiments, rotation of the driving shaft in the first rotational direction between the second rotational position and the third rotational position causes the second restraint to rotate between the raised position and the lowered position, while the first restraint remains secured in one of the raised position or the lowered position.

In various embodiments, the first driven gear comprises a first perimetrical surface comprising a first concave radiused surface, a second concave radiused surface, and a slot disposed between the first concave radiused surface and the second concave radiused surface, wherein a first tab is formed between the first concave radiused surface and the slot and a second tab is formed between the second concave radiused surface and the slot.

In various embodiments, the first driving gear comprises a second perimetrical surface comprising a convex radiused surface, a driving tab disposed radially from the convex radiused surface, and a channel disposed in the convex radiused surface, wherein the channel is configured to receive at least a portion of the first tab and the second tab in response to the first driving gear rotating with the driving shaft.

In various embodiments, the first driving gear comprises a convex radiused surface and a first plurality of teeth. In various embodiments, the first driven gear comprises a second plurality of teeth, wherein the second plurality of teeth comprises a first stopping tooth, a second stopping tooth, and a shortened tooth disposed between the first stopping tooth and the second stopping tooth, wherein the first stopping tooth, the second stopping tooth, and the shortened tooth are configured to slidingly engage the convex radiused surface of the first driving gear to secure the first driven gear in a rotational position while the first driving gear rotates with respect to the first driven gear. In various embodiments, the second plurality of teeth further comprises a third stopping tooth, a fourth stopping tooth, and a second shortened tooth disposed between the third stopping tooth and the fourth stopping tooth, wherein the third stopping tooth, the fourth stopping tooth, and the second shortened tooth are configured to slidingly engage the convex radiused surface of the first driving gear to secure the first driven gear in a rotational position while the first driving gear rotates with respect to the first driven gear. The first stopping tooth, the second stopping tooth, and the shortened tooth may secure the restraint in a lowered position. The third stopping tooth, the fourth stopping tooth, and the second shortened tooth may secure the restraint in a raised position.

A method for restraining or releasing cargo with a cargo loading system of an aircraft is disclosed herein. The method comprises rotating a driving shaft in a first rotational direction between a first rotational position and a second rotational position, rotating a first driving gear with the driving shaft, rotating a second driving gear with the driving shaft, rotating a first driven gear with the first driving gear while the driving shaft rotates in the first rotational direction between the first rotational position and the second rotational position, rotating a first restraint with the first driven gear between a raised position and a lowered position while the driving shaft rotates in the first rotational direction between the first rotational position and the second rotational position, and securing a second restraint in one of the raised position and the lowered position with a second driven gear and the second driving gear while the driving shaft rotates in the first rotational direction between the first rotational position and the second rotational position.

In various embodiments, method further comprises further rotating the driving shaft in the first rotational direction between the second rotational position and a third rotational position, rotating the second driven gear with the second driving gear while the driving shaft rotates in the first rotational direction between the second rotational position and the third rotational position, and rotating the second restraint with the second driven gear between the raised position and the lowered position while the driving shaft rotates in the first rotational direction between the second rotational position and the third rotational position.

In various embodiments, the method further comprises securing the first restraint in one of the raised position and the lowered position with the first driven gear and the first driving gear while the driving shaft rotates in the first rotational direction between the second rotational position and the third rotational position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 6A illustrates a section view of the cargo restraint arrangement of FIG. 5A, in accordance with various embodiments;

FIG. 6B illustrates a section view of the cargo restraint arrangement of FIG. 6A, with the restraint in rotation between a raised position and a lowered position, in accordance with various embodiments;

FIG. 6C illustrates a section view of the cargo restraint arrangement of FIG. 5B, in accordance with various embodiments;

FIG. 7A through FIG. 7E illustrate a first restraint at a first axial position of the driving shaft of FIG. 2 with the first restraint in various positions as the driving shaft rotates in a single rotational direction, in accordance with various embodiments;

FIG. 8A through FIG. 8E illustrate a second restraint at a second axial position of the driving shaft of FIG. 2 with the second restraint in various positions as the driving shaft rotates in a single rotational direction, in accordance with various embodiments;

FIG. 11A illustrates a section view of the cargo restraint arrangement of FIG. 10A, in accordance with various embodiments;

FIG. 11B illustrates a section view of the cargo restraint arrangement of FIG. 11A, with the restraint in rotation between a raised position and a lowered position, in accordance with various embodiments;

FIG. 11C illustrates a section view of the cargo restraint arrangement of FIG. 10B, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "rotate between a [first] position and a [second] position" includes rotation from the [first] position to the [second] position and also includes rotation from the [second] position to the [first] position. For example, a driving shaft of the present disclosure may be configured to cause a driven gear to "rotate between" a lowered position and a raised position. This includes causing the driven gear to rotate from the lowered position to the raised position, and also includes causing the driven gear to rotate from the raised position to the lowered position.

Figure 1:
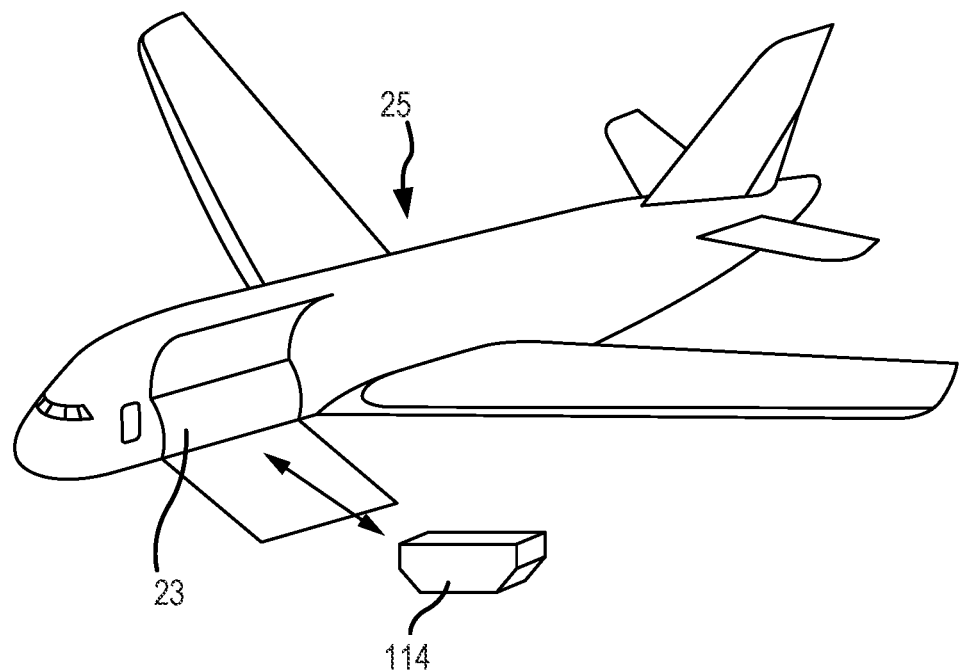
FIG. 1 illustrates an axonometric view of an aircraft being loaded with cargo, in accordance with various embodiments.
Figure 2:
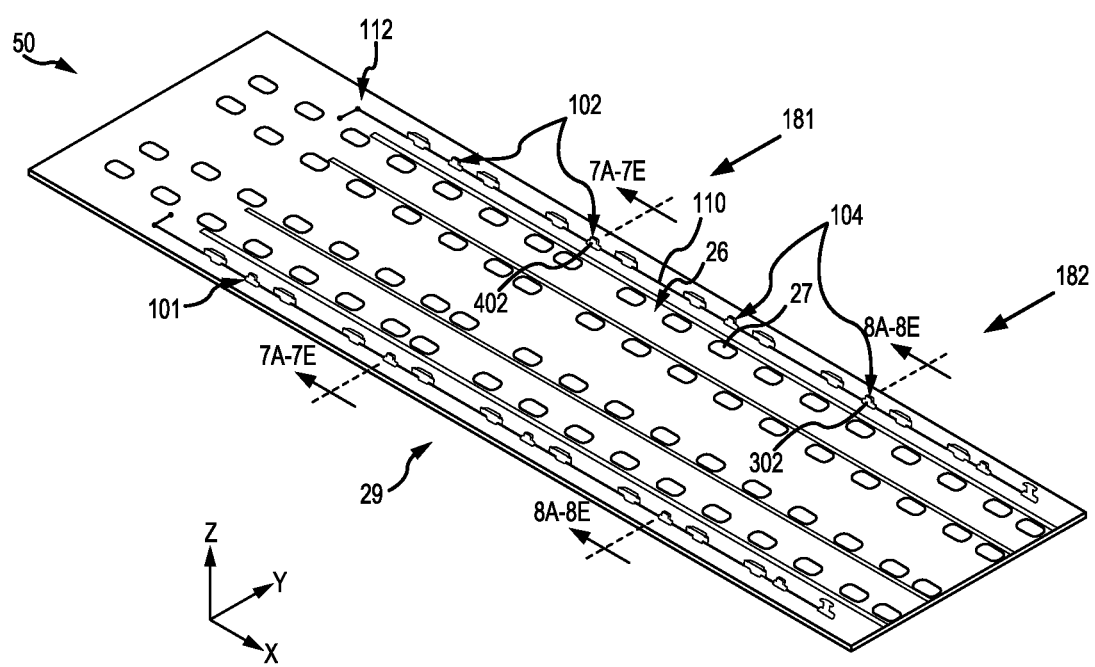
FIG. 2 illustrates a portion of an aircraft cargo deck having a cargo restraint system, in accordance with various embodiments.

FIG. 1 illustrates an aircraft 25 and a unit load device (ULD) 114 being loaded into the aircraft 25 and FIG. 2 illustrates an aircraft cargo deck 29 and cargo loading system 50 that can be used to implement various embodiments of the present disclosure. An X-Y-Z axis is shown in various drawings to illustrate various orientations of components.

A compartment floor 26 forms a deck of an aircraft, adjacent a cargo bay loading door 23. However, there are many other aircraft cargo deck configurations to which the embodiments of the disclosure can be implemented. For example, various aircraft, particularly those configured primarily for the transportation of cargo without passengers, have the upper passenger deck removed and an additional larger cargo deck installed. As another example, an aircraft may include a cargo loading door at any location of the aircraft (e.g., instead of, or in addition to, the cargo bay loading door 23 on the left side of the aircraft 25). Other aircraft may have three or more parallel longitudinal tracks.

The cargo compartment may include a cargo loading system comprising a plurality of freely rotating conveyance rollers 27 mounted in the cargo deck 29 to define the conveyance plane. Cargo loaded onto the aircraft cargo deck 29 can be moved manually throughout the cargo bay upon the freely rotating conveyance rollers 27.

Referring to FIG. 2, the cargo loading system 50 may include a cargo restraint system 101 used to restrain cargo (e.g., ULDs) within the aircraft cargo deck 29. The cargo restraint system 101 may include a first plurality of restraints 102 configured to collectively secure a first ULD (not shown in FIG. 2) to the cargo deck 29. The cargo restraint system 101 may include a second plurality of restraints 104 configured to collectively secure a second ULD (not shown in FIG. 2) to the cargo deck 29. Restraints 102 and restraints 104 may be referred to as X-restraints as they may restrict cargo along the X direction. However, one skilled in the art will realize that restraints 102 and restraints 104 may be used to restrain cargo in any other directions (e.g., restraints 102 and restraints 104 may restrain cargo along the X direction, the Y direction, the Z direction, and/or combinations thereof). The restraint system 101 may include a control region 112 usable to control restraints 102 and restraints 104. Although described herein primarily with respect to two sets of restraints, any number of sets of restraints may be utilized in cargo deck 29, such as three sets of restraints, four sets of restraints, five sets of restraints, and so on.

Figure 3:
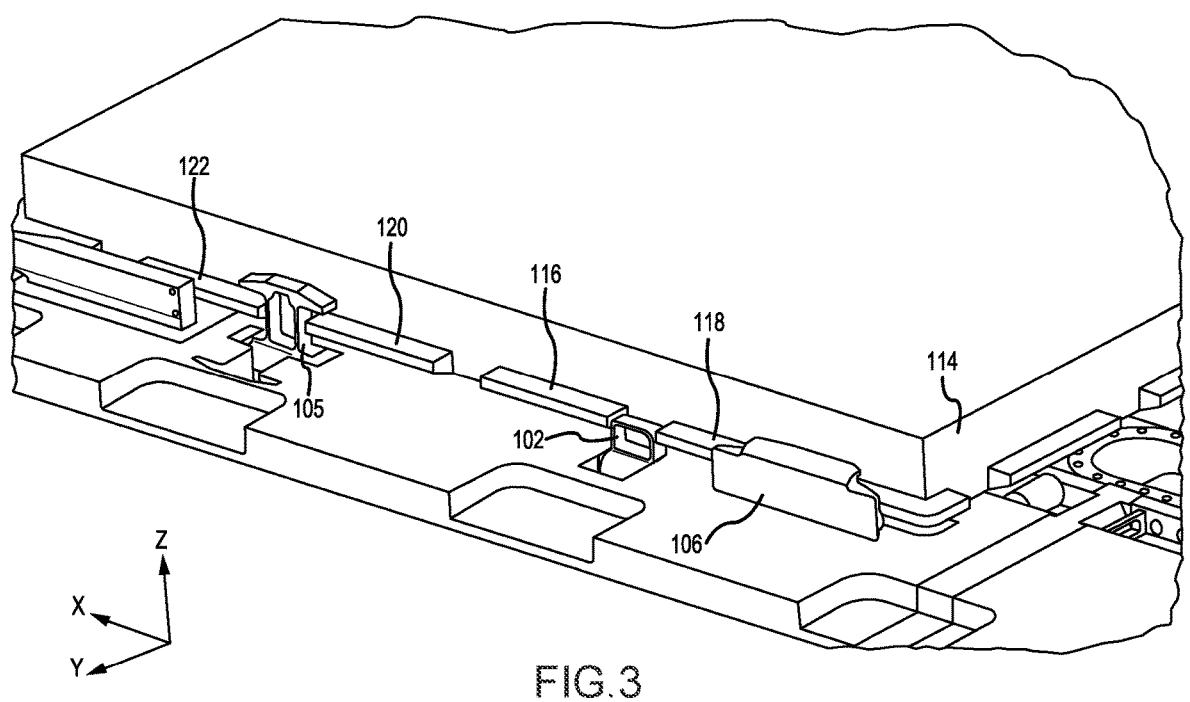
FIG. 3 illustrates a portion of the cargo restraint system of FIG. 2, in accordance with various embodiments.

FIG. 3 illustrates how the various restraints may restrain a ULD 114. As shown, the restraint 102 may rest between tabs 116, 118 of the ULD 114, restricting movement of the ULD 114 along the X direction. Restraint 104 (see FIG. 2) may rest between tabs of the second ULD, similar to restraint 102, restricting movement of the second ULD along the X direction.

FIG. 3 illustrates other types of restraints, including restraint 105 and restraint 106. Restraint 105 may rest above tab 120 and tab 122 of the ULD 114, thus restricting movement of the ULD 114 in the Z direction. Restraint 106 may rest adjacent and above the tab 118, thus restricting movement of the ULD 114 in the Y and Z direction. In various embodiments, restraints 102 and/or restraints 104 may be similar to restraint 105.

Figure 4A:
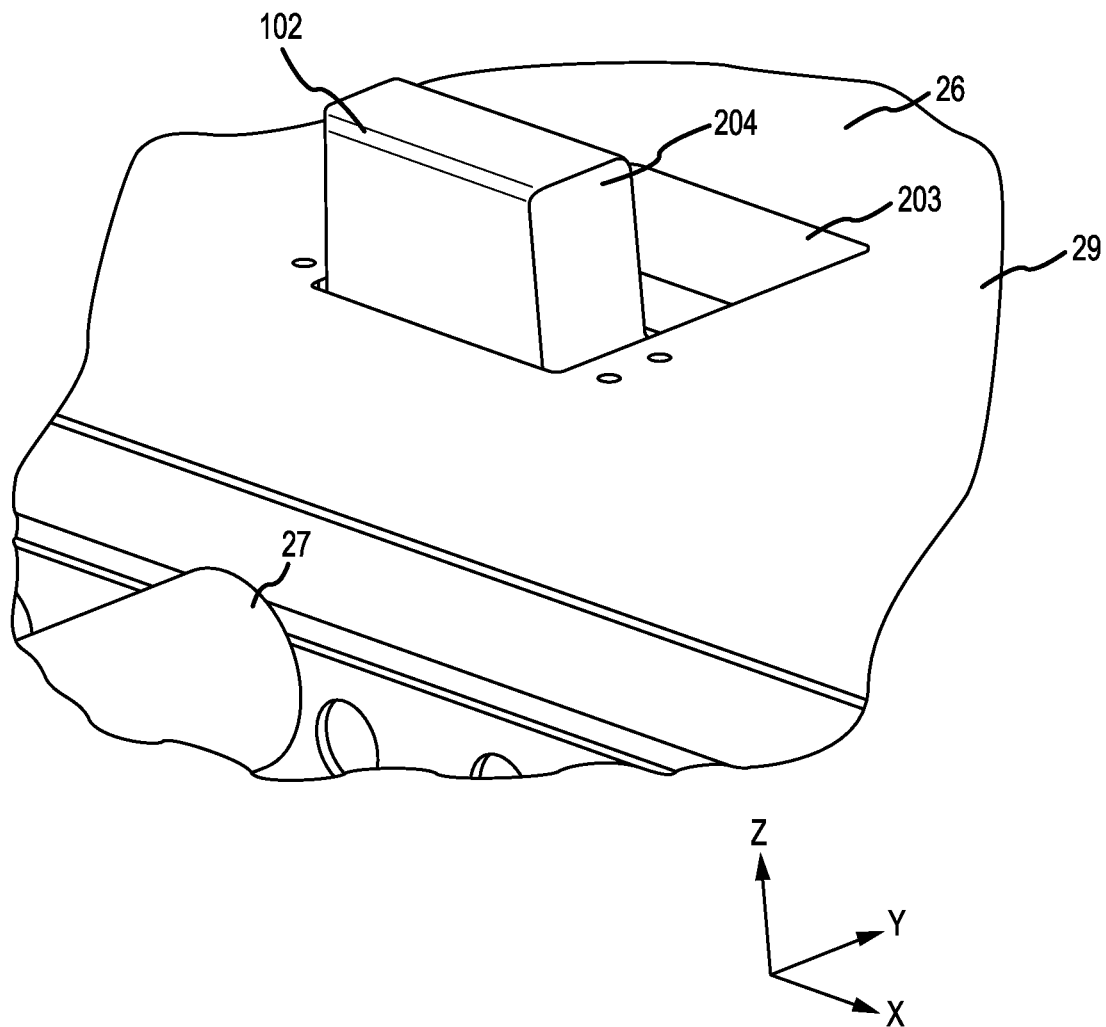
FIGS. 4A and 4B illustrate a first restraint of the cargo restraint system of FIG. 2 in a raised position and a lowered position, respectively, in accordance with various embodiments.
Figure 4B:
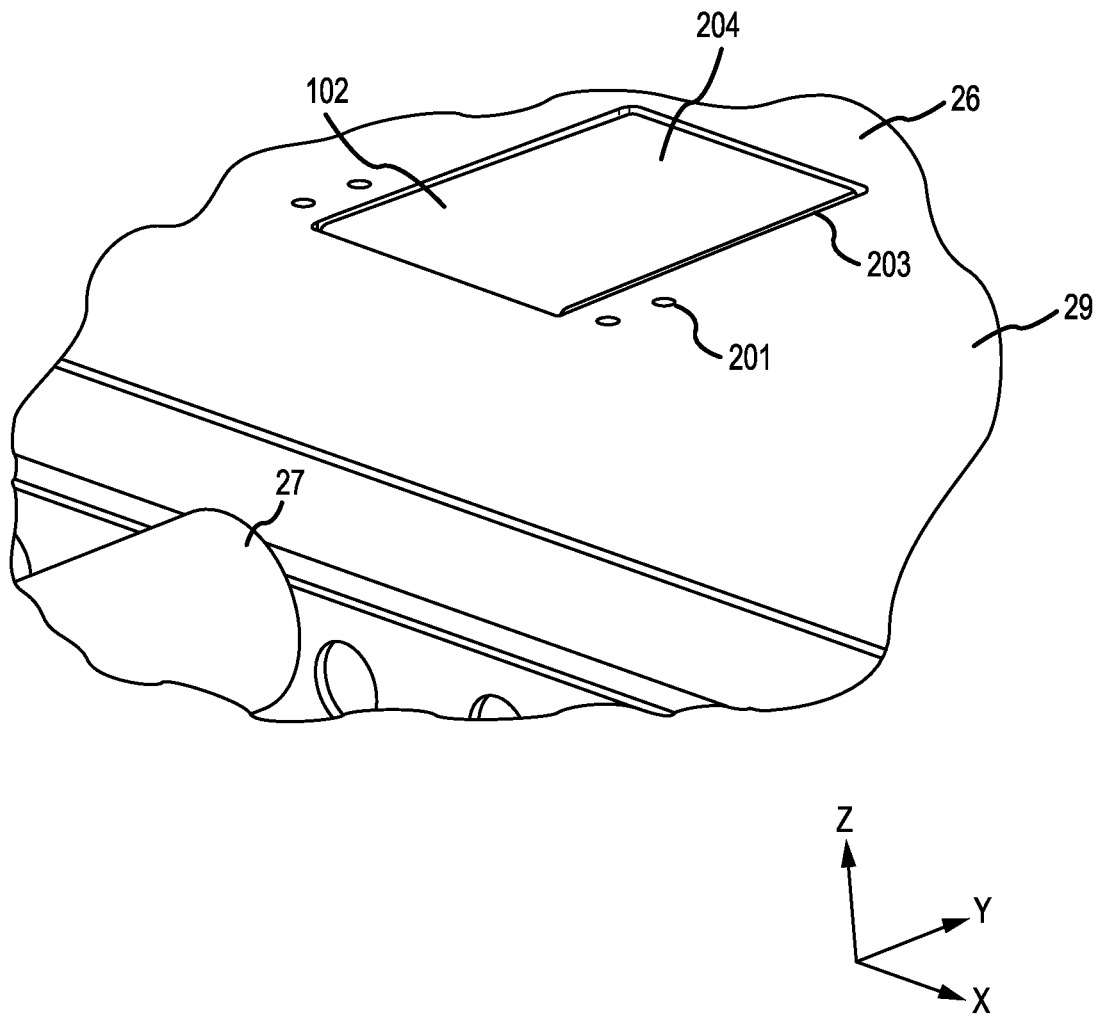

Referring now to FIG. 4A and FIG. 4B, additional details of the restraint 102 are shown. As shown, the restraint 102 may be actuated between a raised position (as shown in FIG. 4A) and a lowered position (as shown in FIG. 4B). In various embodiments, restraint 102 may pivot between the raised position and the lowered position. The restraint 102 may be manipulated using the control region 112 of FIG. 2. Restraint 104 (see FIG. 2) may be manipulated similar to restraint 102.

The restraint 102 may include a head 204 which may be raised or lowered. In response to the head 204 being raised, it may rise above the compartment floor 26. In response to the head 204 being lowered, it may fit within an opening 203 of the compartment floor 26, thus causing it to lay relatively flush with the compartment floor 26. The restraint 102 may be designed to be fastened to the compartment floor 26, such as by using fasteners through apertures 201 of compartment floor 26. However, restraint 102 may be fastened to the compartment floor 26 via any suitable method.

Figure 5A:
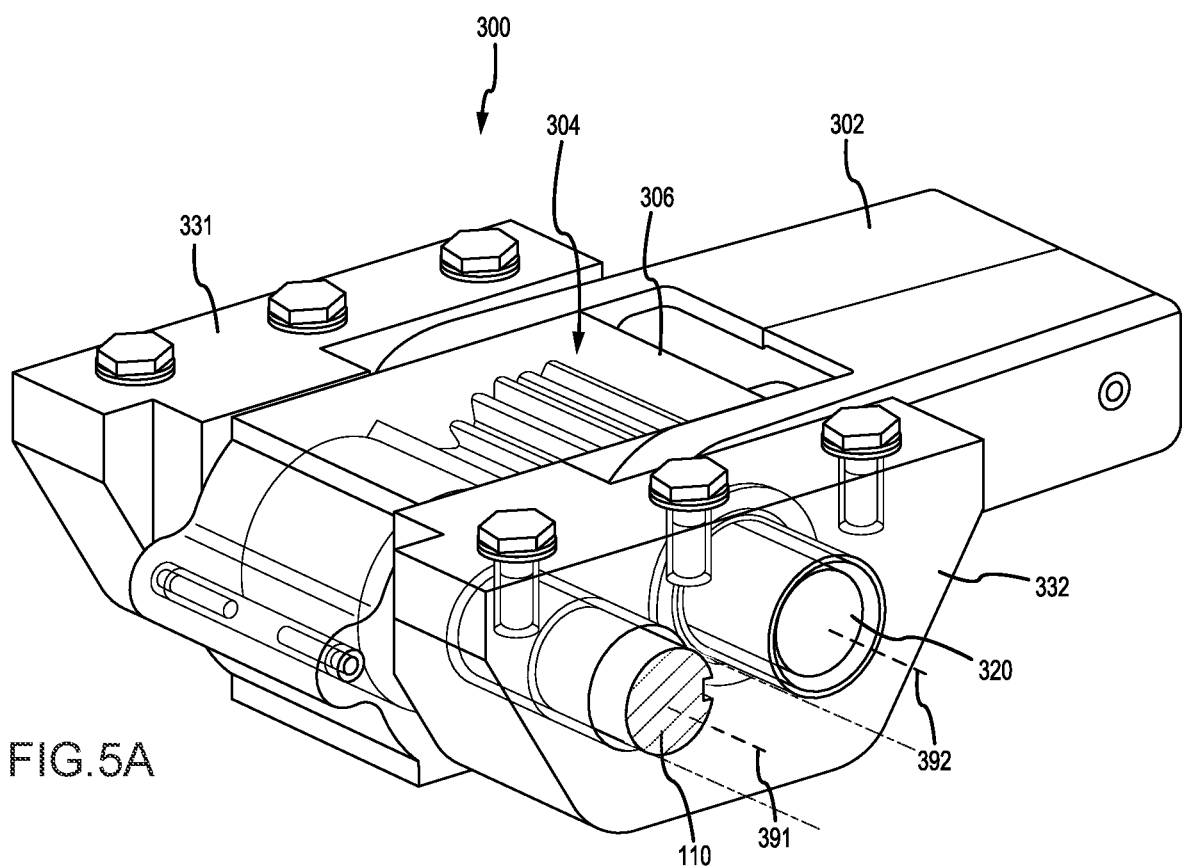
FIG. 5A and FIG. 5B illustrates a cargo restraint arrangement comprising an intermittent gear assembly and a restraint in a lowered position and a raised position, respectively, in accordance with various embodiments.
Figure 5B:
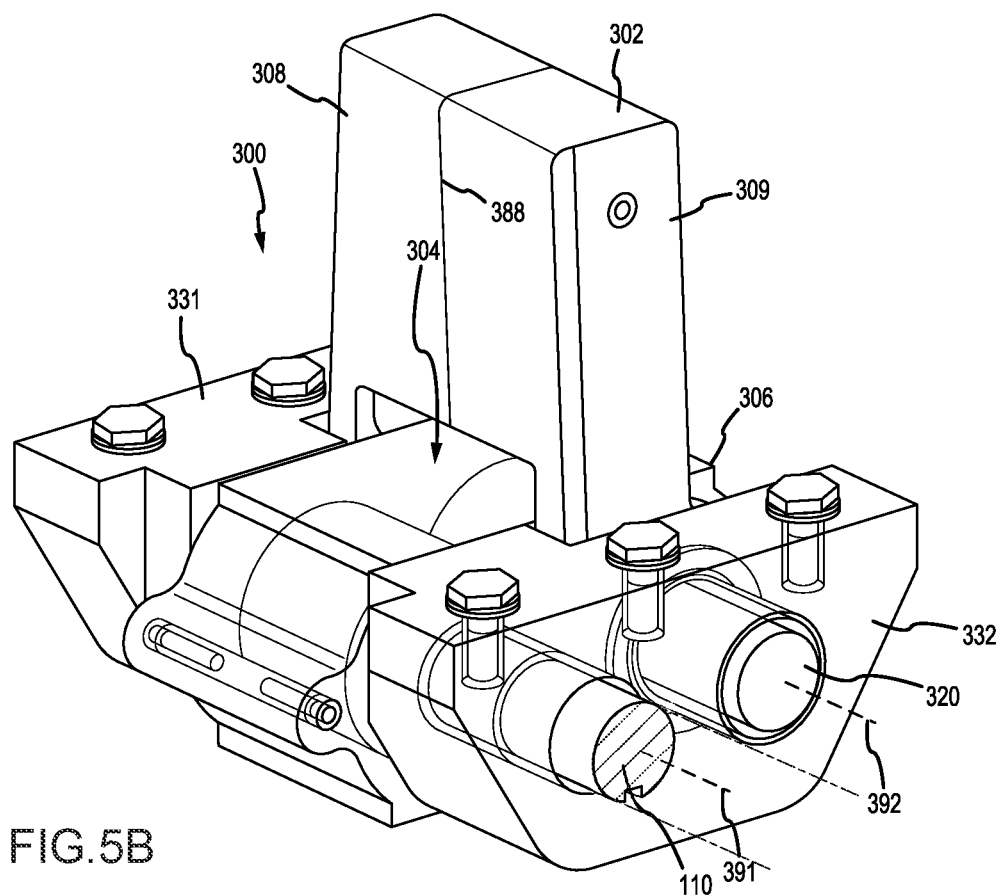

With reference to FIG. 5A and FIG. 5B, a cargo restraint arrangement 300 is illustrated with a restraint 302 in a lowered position and a raised position, respectively. In various embodiments, restraints 102 and/or restraints 104 (see FIG. 2 through FIG. 4B) may be similar to restraint arrangement 300. Restraint arrangement 300 generally comprises restraint 302 pivotally coupled to a shaft 320 (also referred to herein as a driven shaft) and an intermittent gear arrangement 304 (also referred to herein as an intermittent gear transmission and/or an indexing mechanism). Intermittent gear arrangement 304 may be housed within a gear case 306. Intermittent gear arrangement 304 generally comprises a driving gear coupled to shaft 110 (also referred to herein as a driving shaft) and a driven gear coupled to driven shaft 320, as described herein.

In various embodiments, a first mount 331 and a second mount 332 may be provided on either side of gear case 306 for mounting restraint 302 to a cargo deck (e.g., see cargo deck 29 of FIG. 2, FIG. 4A, and FIG. 4B). Driving shaft 110 may extend through first mount 331 and second mount 332. Driving shaft 110 may be mounted to first mount 331 and second mount 332. Driving shaft 110 may rotate about axis 391 (also referred to herein as a first axis). Driven shaft 320 may extend at least partially through first mount 331 and second mount 332. Driven shaft 320 may be mounted to first mount 331 and second mount 332. Driven shaft 320 may rotate about axis 392 (also referred to herein as a second axis).

In various embodiments, restraint 302 may be formed as two separate pieces (e.g., first half 308 and second half 309) and connected together at split line 388. In this manner, driven shaft 320 and driven gear 360 (see FIG. 6A) may be formed as a monolithic structure. To install restraint 302 onto driven shaft 320, first half 308 may be slid over a first end of driven shaft 320 and second half 309 may be slid over a second end of driven shaft 320 wherein the driven gear 360 is disposed between the first half 308 and second half 309. First half 308 and second half 309 may be held together using any suitable method, such as via one or more fasteners, for example.

With reference to FIG. 6A, a section view of the cargo restraint arrangement 300 is illustrated with restraint 302 in the lowered position. Intermittent gear arrangement 304 may comprise a driving gear 340 configured to rotate with the driving shaft 110 and a driven gear 360 configured to rotate with the driven shaft 320. Rotation of driving shaft 110 may drive rotation of driving gear 340 and, depending on the rotational position of driving gear 340, driving gear 340 may drive rotation of driven gear 360 which in turn drives rotation of restraint 302.

As described herein, continuous rotation of driving gear 340 produces an intermittent rotation of driven gear 360. Driving gear 340 comprises a perimetrical surface 342 defining a periphery of driving gear 340 and comprising a driving surface 344 and a dwell surface 346 having no teeth on such portion of its periphery to provide for the desired dwell in the rotation of driven gear 360. Driving surface 344 may be disposed along a first arc length of the perimeter of driving gear 340 and dwell surface 346 may be disposed along the remainder of the perimeter of driving gear 340. Driven gear 360 comprises a perimetrical surface 362 defining a periphery of driven gear 360 and comprising a driven surface 364 and two locking surfaces (i.e., locking surface 366 and locking surface 367) which have their outer edges curved to make a sliding fit with the dwell surface 346 of driving gear 340 to provide for the desired dwell in the rotation of driven gear 360 and to secure driven gear 360 at a rotational position (e.g., a lowered position or a raised position) while driving gear 340 rotates. In this manner, driven gear 360 is positively locked against rotation during the dwell period of driving gear 340.

With reference to FIG. 6B, cargo restraint arrangement 300 is illustrated with restraint 302 moving from the lowered position (see FIG. 6A) toward the raised position (see FIG. 6C). Restraint 302 may rotate together with driven gear 360 between the lowered position and the raised position. In various embodiments, driving surface 344 comprises a plurality of teeth 348. Driven surface 364 may also comprise a plurality of teeth 368 configured to mesh with the plurality of teeth 348 of driving gear 340.

With reference to FIG. 6C, cargo restraint arrangement 300 is illustrated with restraint 302 in the raised position. In various embodiments, dwell surface 346 is a convex radiused surface. Locking surface 366 may comprise a first stopping tooth 371, a second stopping tooth 372, and a shortened tooth 370 disposed between the first stopping tooth 371 and the second stopping tooth 372. The first stopping tooth 371, the second stopping tooth 372, and the shortened tooth 370 may be configured to slidingly engage dwell surface 346 of driving gear 340 to secure driven gear 360 and restraint 302 in a rotational position (e.g., the raised position) while the driving gear 340 continues to rotate with respect to the driven gear 360. In this regard, first stopping tooth 371, second stopping tooth 372, and shortened tooth 370 may generally form a concave geometry complementary to the convex geometry of dwell surface 346 to positively lock driven gear 360 against rotation.

Driven gear 360 may similarly comprise a second locking surface 367 comprising a first stopping tooth 375, a second stopping tooth 376, and a shortened tooth 374 disposed between the first stopping tooth 375 and the second stopping tooth 376. The first stopping tooth 375, the second stopping tooth 376, and the shortened tooth 374 may be configured to slidingly engage dwell surface 346 of driving gear 340 to secure driven gear 360 and restraint 302 in a rotational position (e.g., the lowered position) while the driving gear 340 continues rotation with respect to the driven gear 360.

With momentary reference to FIG. 2. FIG. 7A through FIG. 7E illustrate a first restraint 302 at a first axial position 181 of driving shaft 110 and FIG. 8A through FIG. 8E illustrate a second restraint 402 at a second axial position 182 of the same driving shaft 110. First restraint 302 may be configured to secure a first ULD to the cargo deck 29 and second restraint 402 may be configured to secure a separate second ULD to the cargo deck 29. Thus, it may be desirable to sequentially actuate first restraint 302 and second restraint 402 for sequential loading and/or unloading the first ULD and the second ULD. FIG. 7A through FIG. 8E illustrate side-by-side comparison of first restraint 302 and second restraint 402 during sequential actuation of the restraints, in accordance with various embodiments. Although FIG. 7A through FIG. 8E each illustrate one restraint, it should be appreciated that a set of restraints, each located opposite the ULD from one another at the same longitudinal location of the cargo deck, may be simultaneously actuated. Thus, first restraint 302 may represent a first set of restraints associated with a first ULD, such as restraints 102 of FIG. 2, and second restraint 402 may represent a second set of restraints associated with a second ULD, such as restraints 104 of FIG. 2. Furthermore, as described herein, more than two sets of restraints may be provided along the length of the cargo deck to provide for sequential loading/unloading of more than two ULDs.

With reference to FIG. 7A and FIG. 8A, first restraint 302 and second restraint 402 are both illustrated in the lowered position, for example before cargo is loaded onto cargo deck 29. Both the first restraint 302 and second restraint 402 are operatively coupled to driving shaft 110 via intermittent gear arrangement 304 and intermittent gear arrangement 404, respectively. Cargo restraint arrangement 400 may be similar to cargo restraint arrangement 300, except that restraint 302 is configured to move between the raised position and the lowered position at a different range of motion of driving shaft 110 than restraint 402. More particularly, cargo restraint arrangement 400 may be similar to cargo restraint arrangement 300, except that driving gear 440 of cargo restraint arrangement 400 is rotationally offset from driving gear 340 such that the driving surface 344 of driving gear 340 engages the driven surface 364 of driven gear 360 at a different rotational position than the rotational position that driving surface 444 of driving gear 440 engages the driven surface 464 of driven gear 460. With first restraint 302 in the lowered position, cargo may be loaded onto cargo deck 29 adjacent first restraint 302.

With reference to FIG. 7B and FIG. 8B, as driving shaft 110 rotates a preselected number of degrees of rotation from a first rotational position (see FIG. 7A and FIG. 8A) towards a second rotational position (see FIG. 7C and FIG. 8C), driving surface 344 of driving gear 340 meshingly engages with driven surface 364 of driven gear 360 to drive rotation of driven gear 360 and restraint 302. At the same time, while driving shaft 110 rotates from the first rotational position towards the second rotational position, dwell surface 446 of driving gear 440 slidingly engages with locking surface 467 of driven gear 460 to positively lock driven gear 460 and restraint 402 from rotation—i.e., secures restraint 402 in the lowered position.

In the illustrated embodiment, the preselected number of degrees of rotation between the first position and the second position is ninety degrees, however the preselected number of degrees of rotation may vary depending on the particular designs of cargo restraint arrangement 300 and cargo restraint arrangement 400. For example, by selecting the preselected number of degrees of rotation to be ninety degrees, up to four sets of restraints (each set including two restraints disposed opposite the ULD from one another) may be provided along the length of a cargo deck. However, the preselected number of degrees of rotation may be selected to be sixty degrees to allow for up to six sets of restraints to be provided along the length of a cargo deck. Thus, while FIG. 7A through FIG. 8E describe the sequential raising and lowering of two restraints spaced longitudinally along the cargo deck, it should be appreciated that three, four, five, six, or more restraints may be spaced longitudinally along the cargo deck and sequentially raised and lowered with a single revolution of the driving shaft.

With reference to FIG. 7C and FIG. 8C, as driving shaft 110 reaches the second rotational position (see FIG. 7C and FIG. 8C), driving surface 344 may disengage driven surface 364 and dwell surface 346 may engage locking surface 366 to secure restraint 302 in the raised position. As driving shaft 110 reaches the second rotational position, dwell surface 446 may remain engaged with locking surface 467 to secure restraint 402 from rotation. With driving shaft 110 in the second position, restraint 302 may secure a ULD on cargo deck 29, while restraint 302 remains lowered for accepting another ULD to be loaded adjacent thereto.

With reference to FIG. 7D and FIG. 8D, as driving shaft 110 continues rotation from the second rotational position (see FIG. 7C and FIG. 8C) towards a third rotational position (see FIG. 7E and FIG. 8E), dwell surface 446 of driving gear 440 disengages from locking surface 467 of driven gear 460 and driving surface 444 of driving gear 440 meshingly engages with driven surface 464 of driven gear 460 to drive rotation of driven gear 460 and restraint 402 from the lowered position (see FIG. 8C) toward the raised position (see FIG. 8E). At the same time, while driving shaft 110 rotates from the second rotational position towards the third rotational position, dwell surface 346 of driving gear 340 slidingly engages with locking surface 366 of driven gear 360 to positively lock driven gear 360 and restraint 302 from rotation—i.e., secures restraint 302 in the raised position. In the illustrated embodiment, the preselected number of degrees of rotation between the second position and the third position is ninety degrees, however the preselected number of degrees of rotation may vary depending on the particular designs of cargo restraint arrangement 300 and cargo restraint arrangement 400.

With reference to FIG. 7E and FIG. 8E, as driving shaft 110 reaches the third rotational position, driving surface 444 may disengage driven surface 464 and dwell surface 446 may slidingly engage locking surface 466 to secure restraint 402 in the raised position. As driving shaft 110 reaches the third rotational position, dwell surface 346 may remain engaged with locking surface 366 to secure restraint 302 from rotation and in the raised position. With driving shaft 110 in the third position, both restraint 302 and restraint 402 may each secure associated ULDs on cargo deck 29.

Restraint 302 and restraint 402 may be moved from the raised position to the lowered position in the reverse order as that described with respect to FIG. 7A through FIG. 8A, by rotating driving shaft 110 in the opposite direction.

Figure 9:
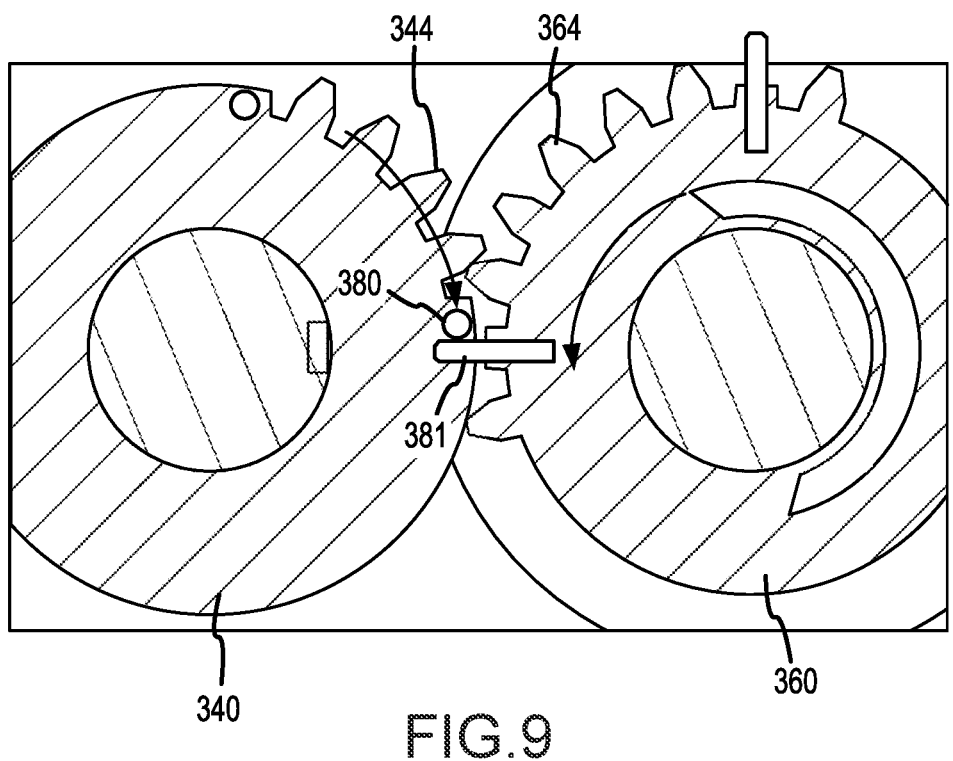
FIG. 9 illustrates a driving gear comprising a driver pin and a driven gear comprising a driven arm, in accordance with various embodiments.

With reference to FIG. 9, an enlarged view of driving gear 340 and driven gear 360 is illustrated, in accordance with various embodiments. In various embodiments, driving gear 340 may further comprise a driver pin 380 and driven gear 360 may further comprises a driven arm 381. Driver pin 380 may extend from the side of driving gear 340, axially offset from driving surface 344. Driven arm 381 may extend from the side of driven gear 360, axially offset from driven surface 364. Driver pin 380 may extend parallel with the axis of rotation of driving gear 340. Driven arm 381 may extend perpendicular to the axis of rotation of driven gear 360; though driven arm 381 may extend at any angle with respect to the axis of rotation of driven gear 360. Driver pin 380 may be configured to contact driven arm 381 as, or slightly before, driving surface 344 engages in mesh with driven surface 364 to begin rotation of driven gear 360 and facilitate smooth engagement between driving gear 340 and driven gear 360. Stated differently, driver pin 380 and driven arm 381 may be positioned to cause driven surface 364 to better align with driving surface 344 as driving gear 340 rotates and transitions from a dwell period to a driving period.

Figure 10A:
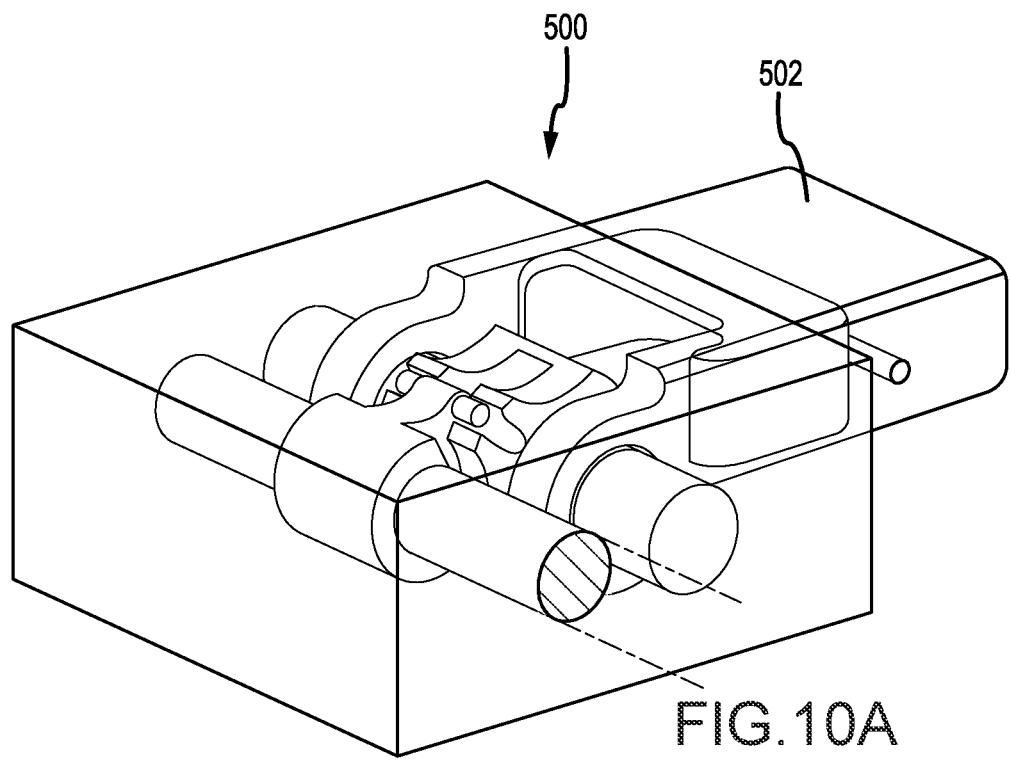
FIG. 10A and FIG. 10B illustrates a cargo restraint arrangement comprising an indexing mechanism assembly and a restraint in a lowered position and a raised position, respectively, in accordance with various embodiments.
Figure 10B:
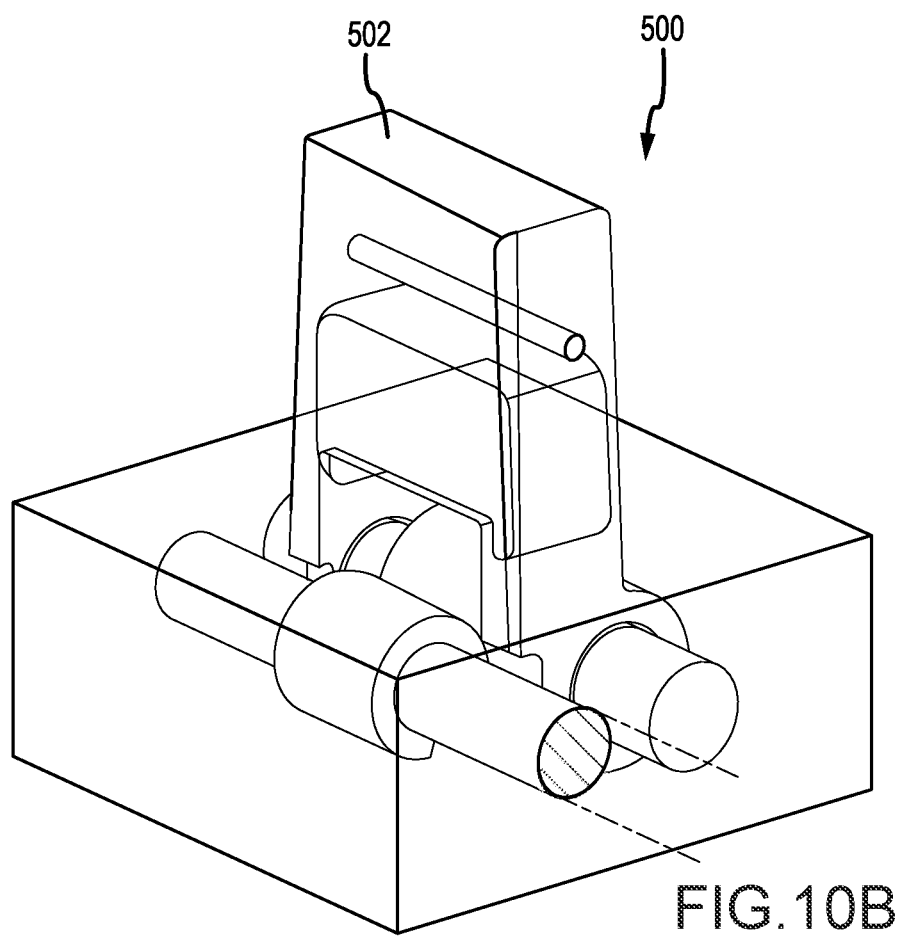

With reference to FIG. 10A and FIG. 10B, a cargo restraint arrangement 500 is illustrated with a restraint 502 in a lowered position and a raised position, respectively. All of the components of cargo restraint arrangement 500 may be similar to cargo restraint arrangement 300 (see FIG. 5A and FIG. 5B), except indexing mechanism arrangement 504. Stated differently, instead of comprising driving gear 340 and driven gear 360 (see FIG. 6A through FIG. 6C), cargo restraint arrangement 500 comprises driving gear 540 and driven gear 560. In various embodiments, cargo restraint arrangement 300 (see FIG. 7A), and/or cargo restraint arrangement 400 (see FIG. 8A) may be similar to cargo restraint arrangement 500.

With reference to FIG. 11A, a section view of the cargo restraint arrangement 500 is illustrated with restraint 502 in the lowered position. Indexing mechanism arrangement 504 comprises driving gear 540 and driven gear 560. Driving gear 540 comprises a perimetrical surface 542 defining a periphery of driving gear 540 and comprising a driving surface 544 and a dwell surface 546 to provide for the desired dwell in the rotation of driven gear 560. Driven gear 560 comprises a perimetrical surface 562 defining a periphery of driven gear 560 and comprising a driven surface 564 and a locking surface 566 which has its outer edge curved to make a sliding fit with the dwell surface 546 of driving gear 540 to provide for the desired dwell in the rotation of driven gear 560 and to secure driven gear 560 at a rotational position (e.g., a lowered position or a raised position) while driving gear 540 rotates. In this manner, driven gear 560 is positively locked against rotation during the dwell period of driving gear 540.

Dwell surface 546 may be a convex radiused surface. Locking surface 566 may be a concave radiused surface. The geometry of locking surface 566 may be complementary to the geometry of dwell surface 546. Perimetrical surface 562 may further comprise a locking surface 567 (also referred to herein as a second locking surface). Locking surface 567 may be a concave radiused surface. The geometry of locking surface 567 may be complementary to the geometry of dwell surface 546. Locking surface 567 may be configured to slidingly engage dwell surface 546 of driving gear 540 to secure driven gear 560 and restraint 502 in a rotational position (e.g., the lowered position) during certain rotational positions of driving gear 540 as driving gear 540 rotates with respect to the driven gear 560.

Driven surface 564 may define a slot 568. Slot 568 is disposed between locking surface 566 and locking surface 567. A first tab 571 may be formed between locking surface 566 and slot 568. A second tab 572 may be formed between locking surface 567 and slot 568. Driving surface 544 may comprises a pin 548 disposed radially from dwell surface 546. Slot 568 may be configured to receive pin 548. As driving gear 540 rotates, pin 548 may enter slot 568 and contact driven surface 564 to impart torque loads on driven gear 560 and drive rotation of driven gear 560.

With reference to FIG. 11B, cargo restraint arrangement 500 is illustrated with restraint 502 moving from the lowered position (see FIG. 11A) toward the raised position (see FIG. 11C). Restraint 502 may rotate together with driven gear 560 between the lowered position and the raised position. Pin 548 is depicted in slot 568. Perimetrical surface 542 may comprise a cutout or channel 585 to accommodate movement of first tab 571 and second tab 572. Channel 585 may be located at the same side of driving gear 540 as pin 548.

With reference to FIG. 11C, cargo restraint arrangement 500 is illustrated with restraint 502 in the raised position. Locking surface 566 may slidingly engage dwell surface 546 of driving gear 540 to secure driven gear 560 and restraint 502 in a rotational position (e.g., the raised position) while the driving gear 540 continues to rotate with respect to the driven gear 560.

Figure 12:
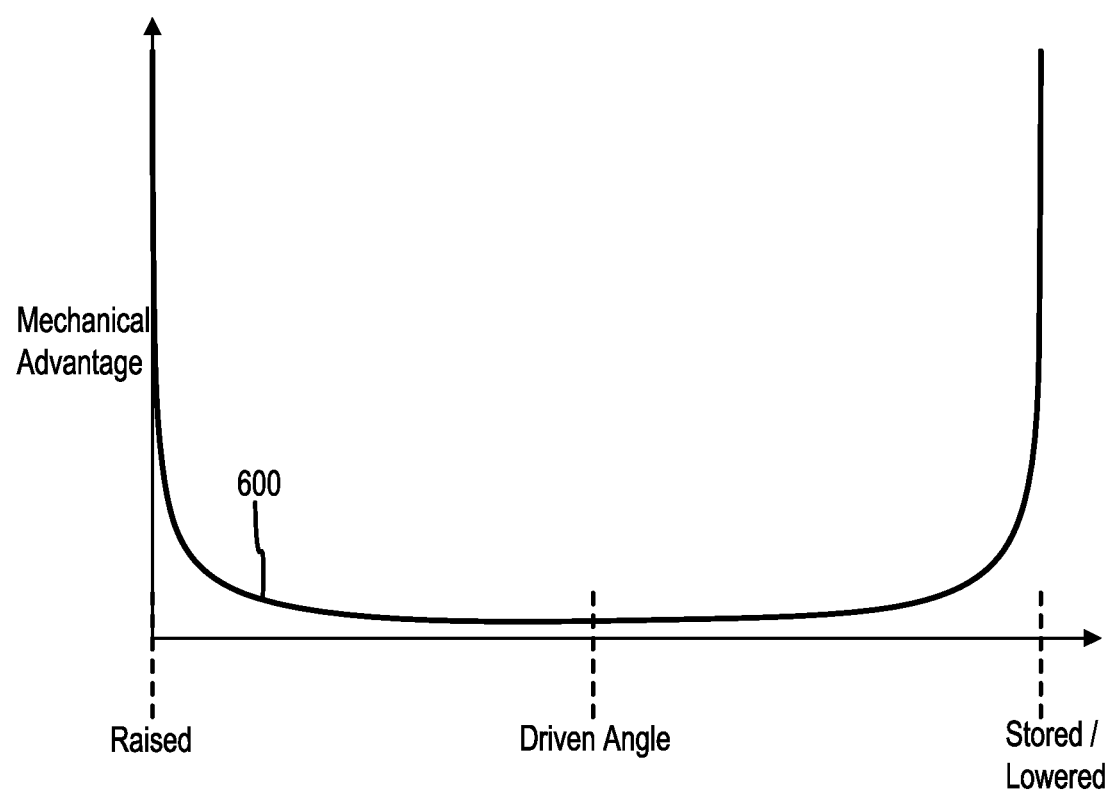
FIG. 12 illustrates a curve of the mechanical advantage of the indexing mechanism arrangement of FIG. 10A at various rotational angles, in accordance with various embodiments.

With reference to FIG. 12, a curve 600 illustrating the mechanical advantage of indexing mechanism arrangement 504 at various rotational angles. As can be seen from the curve 600, the mechanical advantage of gear arrangement 504 is greatest near the raised position and the lowered position. Thus, cargo restraint arrangement 500 may benefit from the increased mechanical advantage of indexing mechanism arrangement 504 during positions of restraint 502 when increased mechanical advantage may be desired. For example, when restraint 502 is in the raised position, longitudinal loads may be transmitted from a ULD into restraint 502, which tends to increase torque loads through restraint 502 as restraint 502 begins to move from the raised position to the lowered position.

Figure 13:
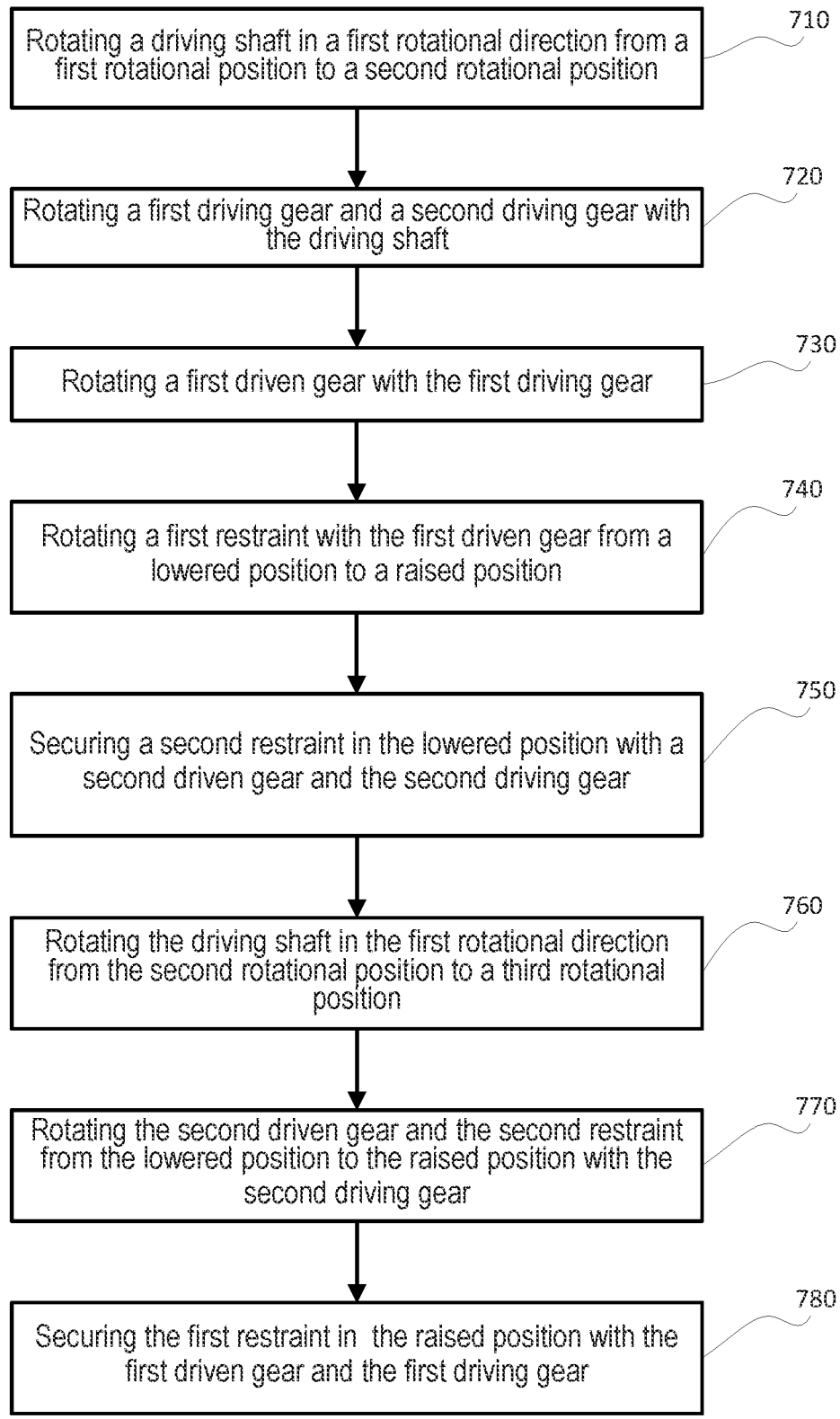
FIG. 13 illustrates a method for restraining or releasing cargo with a cargo loading system, in accordance with various embodiments.

With reference to FIG. 13, a method 700 for restraining cargo with a cargo loading system of an aircraft is provided, in accordance with various embodiments. Method 700 includes rotating a driving shaft in a first rotational direction from a first rotational position to a second rotational position (step 710). Method 700 includes rotating a first driving gear and a second driving gear with the driving shaft. Method 700 includes rotating a first driven gear with the first driving gear (step 730). Method 700 includes rotating a first restraint with the first driven gear from a lowered position to a raised position (step 740). Method 700 includes securing a second restraint in the lowered position with a second driven gear and the second driving gear (step 750). Method 700 may further include rotating the driving shaft in the first rotational direction from the second rotational position to a third rotational position (step 760). Method 700 may further include rotating the second driven gear and the second restraint from the lowered position to the raised position with the second driving gear while the driving shaft rotates in the first rotational direction between the second rotational position and the third rotational position (step 770). Method 700 may further include securing the first restraint in the raised position with the first driven gear and the first driving gear (step 780). In various embodiments, the method may be performed in reverse for releasing cargo.

With combined reference to FIG. 7B and FIG. 13, step 710 may include rotating driving shaft 110 in a first rotational direction (i.e., clockwise in FIG. 7B) from a first rotational position (see FIG. 7A) to a second rotational position (see FIG. 7C). With combined reference to FIG. 7B, FIG. 8B, and FIG. 13, step 720 may include rotating first driving gear 340 and second driving gear 440 with driving shaft 110. Step 730 may include rotating first driven gear 360 with first driving gear 340 while the driving shaft 110 rotates in the first rotational direction from the first rotational position to the second rotational position. Step 740 includes rotating first restraint 302 with the first driven gear 360 from a lowered position towards a raised position while the driving shaft 110 rotates in the first rotational direction from the first rotational position (see FIG. 7A) towards the second rotational position (see FIG. 7C). Step 750 may include securing second restraint 402 in the lowered position with second driven gear 460 and second driving gear 440 while the driving shaft 110 rotates in the first rotational direction between the first rotational position and the second rotational position.

With combined reference to FIG. 7D, FIG. 8D, and FIG. 13, step 760 may include further rotating the driving shaft 110 in the first rotational direction between the second rotational position (see FIG. 7C) and a third rotational position (see FIG. 7E). Step 760 may include rotating second driven gear 460 and the second restraint 402 from the lowered position towards the raised position with the second driving gear 440 while the driving shaft 110 rotates in the first rotational direction from the second rotational position towards the third rotational position. Step 780 may include securing the first restraint 302 in the raised position with the first driven gear 360 and the first driving gear 340 while the driving shaft 110 rotates in the first rotational direction from the second rotational position towards the third rotational position. Steps 710 through step 780 may be performed in the reverse order, by rotating the driving shaft 110 in the opposite direction, for sequentially releasing cargo.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo restraint system for use with a cargo loading system of an aircraft, the cargo restraint system comprising:
 a driving shaft configured to rotate about a first axis;
 a first driving gear configured to rotate with the driving shaft, wherein the first driving gear comprises a first driving surface and a first dwell surface;
 a first driven gear configured to rotate about a second axis, wherein the first driven gear comprises a first driven surface and a first locking surface;
 a first restraint configured to rotate together with the first driven gear between a first raised position and a first lowered position;
 a second driving gear configured to rotate with the driving shaft, wherein the second driving gear comprises a second driving surface and a second dwell surface;
 a second driven gear configured to rotate about a third axis, wherein the second driven gear comprises a second driven surface and a second locking surface; and
 a second restraint configured to rotate together with the second driven gear between a second raised position and a second lowered position;
 wherein:
  in response to the driving shaft rotating a first preselected number of degrees of rotation in a first rotational direction, the first driving surface engages the first driven surface to cause the first driven gear to rotate between a first position and a second position, thereby causing the first restraint to rotate with the first driven gear from one of the first lowered position and the first raised position to the other of the first lowered position and the first raised position, and the second dwell surface slidingly engages the second locking surface to secure the second restraint in one of the second lowered position and the second raised position; and
  in response to the driving shaft rotating a second preselected number of degrees of rotation in the first rotational direction, the second driving surface engages the second driven surface to cause the second driven gear to rotate between a third position, and a fourth position thereby causing the second restraint to rotate with the second driven gear from one of the second lowered position and the second raised position to the other of the second lowered position and the second raised position, and the first dwell surface slidingly engages the first locking surface to secure the first restraint in the one of the first lowered position and the first raised position.

2. The cargo restraint system of claim 1, wherein the first driving gear is spaced apart from the second driving gear along the first axis, and the first restraint is spaced apart from the second restraint along the first axis, and the first restraint is rotatable from the first lowered position to the first raised position to restrain a cargo in the aircraft.

3. The cargo restraint system of claim 1, wherein the first driving gear further comprises a driver pin and the first driven gear further comprises a driven arm, wherein the driver pin is configured to contact the driven arm to begin rotation of the first driven gear, while the first driving gear is rotating.

4. The cargo restraint system of claim 1, wherein the first driving surface is disposed along a first arc length of a perimeter of the first driving gear and the first dwell surface is disposed along a second arc length of the perimeter of the first driving gear.

5. The cargo restraint system of claim 1, wherein the first driving surface comprises a first plurality of teeth and the first driven surface comprises a second plurality of teeth.

6. The cargo restraint system of claim 5, wherein the first dwell surface comprises a convex radiused surface.

7. The cargo restraint system of claim 5, wherein the first locking surface comprises at least one tooth of the second plurality of teeth.

8. The cargo restraint system of claim 7, wherein the first locking surface comprises a shortened tooth of the second plurality of teeth.

9. The cargo restraint system of claim 1, wherein the first driving surface comprises a pin disposed radially from the first axis and the first driven surface comprises a slot configured to receive the pin.

10. The cargo restraint system of claim 9, wherein the first dwell surface comprises a convex radiused surface concentric with the first axis.

11. The cargo restraint system of claim 10, wherein the pin is disposed radially outward from the convex radiused surface.

12. The cargo restraint system of claim 11, wherein the first locking surface comprises a concave radiused surface configured to interface with the convex radiused surface of the first dwell surface.

13. A cargo restraint system, comprising:
a driving shaft configured to rotate about a first axis;
a first driving gear configured to rotate with the driving shaft;
a first driven gear configured to rotate about a second axis, wherein the first driven gear is configured to mesh with the first driving gear;
a first restraint configured to rotate together with the first driven gear between a first raised position and a first lowered position;
a second driving gear configured to rotate with the driving shaft;
a second driven gear configured to rotate about a third axis, wherein the second driven gear is configured to mesh with the second driving gear; and
a second restraint configured to rotate together with the second driven gear between a second raised position and a second lowered position;
wherein rotation of the driving shaft in a first rotational direction between a first rotational position and a second rotational position causes the first restraint to rotate between the first raised position and the first lowered position, and further rotation of the driving shaft in the first rotational direction between the second rotational position and a third rotational position causes the second restraint to rotate between the second raised position and the second lowered position.

14. The cargo restraint system of claim 13, wherein when the second restraint is rotated between the second raised position and the second lowered position, the first restraint remains secured in one of the first raised position and the first lowered position.

15. The cargo restraint system of claim 13, wherein the first driven gear comprises a first perimetrical surface comprising a first concave radiused surface, a second concave radiused surface, and a slot disposed between the first concave radiused surface and the second concave radiused surface, wherein a first tab is formed between the first concave radiused surface and the slot and a second tab is formed between the second concave radiused surface and the slot.

16. The cargo restraint system of claim 15, wherein the first driving gear comprises a second perimetrical surface comprising a convex radiused surface, a driving tab disposed radially from the convex radiused surface, and a channel disposed in the convex radiused surface, wherein the channel is configured to receive at least a portion of the first tab and the second tab in response to the first driving gear rotating with the driving shaft.

17. The cargo restraint system of claim 13, wherein:
the first driving gear comprises a convex radiused surface and a first plurality of teeth; and
the first driven gear comprises a second plurality of teeth, wherein the second plurality of teeth comprises a first stopping tooth, a second stopping tooth, and a shortened tooth disposed between the first stopping tooth and the second stopping tooth, wherein the first stopping tooth, the second stopping tooth, and the shortened tooth are configured to slidingly engage the convex radiused surface of the first driving gear to secure the first driven gear in a rotational position while the first driving gear rotates with respect to the first driven gear.

18. A method for one of restraining and releasing cargo with a cargo loading system of an aircraft, the method comprising:
rotating a driving shaft in a first rotational direction between a first rotational position and a second rotational position;
rotating a first driving gear with the driving shaft;
rotating a second driving gear with the driving shaft;
rotating a first driven gear with the first driving gear while the driving shaft rotates in the first rotational direction between the first rotational position and the second rotational position;
rotating a first restraint with the first driven gear between a first raised position and a first lowered position while the driving shaft rotates in the first rotational direction between the first rotational position and the second rotational position; and
securing a second restraint in one of a second raised position and a second lowered position with a second driven gear and the second driving gear while the driving shaft rotates in the first rotational direction between the first rotational position and the second rotational position.

19. The method of claim 18, further comprising:
further rotating the driving shaft in the first rotational direction between the second rotational position and a third rotational position;
rotating the second driven gear with the second driving gear while the driving shaft rotates in the first rotational direction between the second rotational position and the third rotational position; and
rotating the second restraint with the second driven gear between the second raised position and the second lowered position while the driving shaft rotates in the first rotational direction between the second rotational position and the third rotational position.

20. The method of claim 19, further comprising securing the first restraint in one of the first raised position and the first lowered position with the first driven gear and the first driving gear while the driving shaft rotates in the first rotational direction between the second rotational position and the third rotational position.

* * * * *